United States Patent
Katzir et al.

(10) Patent No.: US 8,982,866 B1
(45) Date of Patent: Mar. 17, 2015

(54) DATA CHANNEL NOISE ESTIMATION USING CONTROL CHANNEL

(75) Inventors: Gil Katzir, Herzliya (IL); Shimon Moshavi, Bet Shemesh (IL); Nimrod Mesika, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 97 days.

(21) Appl. No.: 13/231,971

(22) Filed: Sep. 14, 2011

Related U.S. Application Data

(60) Provisional application No. 61/391,348, filed on Oct. 8, 2010.

(51) Int. Cl.
| | |
|---|---|
| *H04B 7/216* | (2006.01) |
| *H04B 17/00* | (2006.01) |
| *H04B 1/10* | (2006.01) |
| *H04L 1/20* | (2006.01) |
| *H04B 1/707* | (2011.01) |

(52) U.S. Cl.
CPC .......... *H04B 17/0055* (2013.01); *H04B 1/1027* (2013.01); *H04L 1/20* (2013.01); *H04B 1/707* (2013.01)
USPC ........................................................ 370/342

(58) Field of Classification Search
USPC ............................ 370/335, 342; 455/63.1, 501
See application file for complete search history.

(56) References Cited

U.S. PATENT DOCUMENTS

| | | | |
|---|---|---|---|
| 7,106,792 B2 * | 9/2006 | Corbaton et al. ............. | 375/232 |
| 7,664,061 B2 | 2/2010 | Hottinen | |
| 8,301,989 B1 | 10/2012 | Griniasty | |
| 8,331,505 B2 | 12/2012 | Abrishamkar et al. | |
| 8,411,802 B2 | 4/2013 | Kim et al. | |
| 2001/0036150 A1 * | 11/2001 | Padovani ....................... | 370/206 |
| 2003/0072390 A1 | 4/2003 | Corbaton et al. | |
| 2003/0092447 A1 | 5/2003 | Bottomley et al. | |
| 2004/0076224 A1 | 4/2004 | Onggosanusi et al. | |
| 2005/0002444 A1 * | 1/2005 | Wei et al. ....................... | 375/147 |
| 2005/0089115 A1 | 4/2005 | Hartmann et al. | |
| 2007/0054692 A1 | 3/2007 | Nie et al. | |
| 2007/0287382 A1 * | 12/2007 | Catreux-Erceg et al. .... | 455/63.1 |
| 2008/0232327 A1 | 9/2008 | Kuroyanagi et al. | |
| 2009/0016420 A1 | 1/2009 | Kwak et al. | |
| 2009/0086647 A1 * | 4/2009 | Shnaider et al. .............. | 370/252 |
| 2009/0141786 A1 * | 6/2009 | Park et al. ...................... | 375/227 |
| 2009/0296563 A1 | 12/2009 | Kishiyama et al. | |
| 2009/0310708 A1 | 12/2009 | Cheng et al. | |
| 2009/0310715 A1 | 12/2009 | Cairns et al. | |
| 2009/0316842 A1 * | 12/2009 | Lu et al. ......................... | 375/346 |
| 2010/0284443 A1 * | 11/2010 | Rosenqvist et al. .......... | 375/147 |

(Continued)

OTHER PUBLICATIONS

3GPP TS 25.308 V8.9.0, "3rd Generation Partnership Project; Technical Specification Group Radio Access Network; High Speed Downlink Packet Access (HSDPA); Overall description; Stage 2 (Release 8)", Sep. 2010.

U.S. Appl. No. 13/246,875, filed Sep. 28, 2011.

(Continued)

*Primary Examiner* — Hoon J Chung
*Assistant Examiner* — Yaotang Wang

(57) ABSTRACT

A method includes receiving a Code-Division Multiple Access (CDMA) signal carrying at least a data channel, a pilot channel and a control channel. A first noise level is estimated on the pilot channel. A second noise level is estimated on the control channel. The first estimated noise level and the second estimated noise level are combined to produce a noise estimate of noise on the data channel.

18 Claims, 2 Drawing Sheets

(56) References Cited

U.S. PATENT DOCUMENTS

2011/0305195 A1    12/2011   Forck et al.
2012/0082192 A1    4/2012   Pelletier et al.

OTHER PUBLICATIONS

U.S. Appl. No. 13/246,875 Office Action dated Jun. 19, 2013.
U.S. Appl. No. 13/246,875 office action dated Sep. 30, 2013.

* cited by examiner

_US 8,982,866 B1_

DATA CHANNEL NOISE ESTIMATION USING CONTROL CHANNEL

CROSS-REFERENCE TO RELATED APPLICATIONS

This application claims the benefit of U.S. Provisional Patent Application No. 61/391,348, filed Oct. 8, 2010, whose disclosure is incorporated herein by reference.

FIELD OF THE DISCLOSURE

The present invention relates generally to communication systems, and particularly to methods and systems for noise estimation.

BACKGROUND

The Third-Generation Partnership Project (3GPP) Wideband Code-Division Multiple Access (WCDMA) specifications define a high-speed downlink data mode called High-Speed Downlink Packet Access (HSDPA). This mode is specified, for example, in "$3^{rd}$ Generation Partnership Project; Technical Specification Group Radio Access Network; High Speed Downlink Packet Access (HSDPA); Overall description; Stage 2 (Release 8)," TS 25.308, version 8.9.0, Sep., 2010, which is incorporated herein by reference. In the HSDPA mode, downlink data is transmitted on High-Speed Downlink Shared channels (HS-DSCH) while control information is transmitted on High-Speed Shared Control Channels (HS-SCCH). User Equipment (UE) operating in the HSDPA mode sometimes synchronize and perform signal measurements on a Primary Common Pilot Channel (P-CPICH).

The description above is presented as a general overview of related art in this field and should not be construed as an admission that any of the information it contains constitutes prior art against the present patent application.

SUMMARY

An embodiment that is described herein provides a method including receiving a Code-Division Multiple Access (CDMA) signal carrying at least a data channel, a pilot channel and a control channel. A first noise level is estimated on the pilot channel. A second noise level is estimated on the control channel. The first estimated noise level and the second estimated noise level are combined to produce a noise estimate of noise on the data channel.

In some embodiments, receiving the CDMA signal includes receiving a Wideband CDMA (WCDMA) carrier, estimating the second noise level includes assessing the noise for a High-Speed Shared Control Channel (HS-SCCH), and combining the first estimated noise level and the second estimated noise level produces the noise estimate of noise on a High-Speed Downlink Shared channel (HS-DSCH).

In an embodiment, estimating the second noise level includes decoding the control channel to produce control data, re-encoding the control data to produce a regenerated control channel, and assessing the second noise level using the regenerated control channel. In a disclosed embodiment, assessing the second noise level includes estimating a deviation of the received control channel from the regenerated control channel. In another embodiment, assessing the second noise level includes applying to the received control channel a phase rotation that depends on the regenerated control channel, so as to produce a phase-rotated control channel, and assessing the second noise level on the phase-rotated control channel.

In an example embodiment, applying the phase rotation includes converting the received control channel into a virtual pilot signal having a signal component that varies over time at less than a predefined rate. In an embodiment, the method includes verifying a Cyclic Redundancy Check (CRC) of the decoded control channel, and re-encoding the control data only when the CRC is valid.

In yet another embodiment, combining the first and second estimated noise levels includes computing a weighted average of the first and second noise levels. In an embodiment, computing the weighted average includes weighting the first estimated noise level and the second estimated noise level depending on respective spread factors of the pilot channel and the control channel. In a disclosed embodiment, computing the weighted average includes weighting the first estimated noise level and the second estimated noise level depending on respective numbers of samples of the pilot channel and the control channel used in estimating the first and second noise levels.

In some embodiments, receiving the CDMA signal includes receiving the data channel in a first transmit diversity mode and receiving the control channel in a second transmit diversity mode that is different from the first transmit diversity mode. In an embodiment, receiving the control channel includes receiving primary and diversity symbols of the control channel in accordance with the second transmit diversity mode, and estimating the second noise level includes combining the primary and diversity symbols to produce first and second virtual pilots, and estimating the second noise level using the first and second virtual pilots.

In another embodiment, receiving the data channel includes receiving the data channel in a Closed-Loop Transmit Diversity (CLTD) mode, and receiving the control channel includes receiving the control channel in a Space-Time Transmit Diversity (STTD) mode. In still another embodiment, receiving the CDMA carrier includes receiving the data channel in a Multiple-Input Multiple-Output (MIMO) mode in which multiple data streams are transmitted concurrently via multiple transmit antennas.

There is additionally provided, in accordance with an embodiment that is described herein, apparatus including a receiver front end and processing circuitry. The receiver front end is configured to receive a Code-Division Multiple Access (CDMA) signal carrying at least a data channel, a pilot channel and a control channel. The processing circuitry is configured to estimate a first noise level of noise on the pilot channel, to estimate a second noise level of noise on the control channel, and to combine the first estimated noise level and the second estimated noise level to produce a noise estimate of noise on the data channel In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
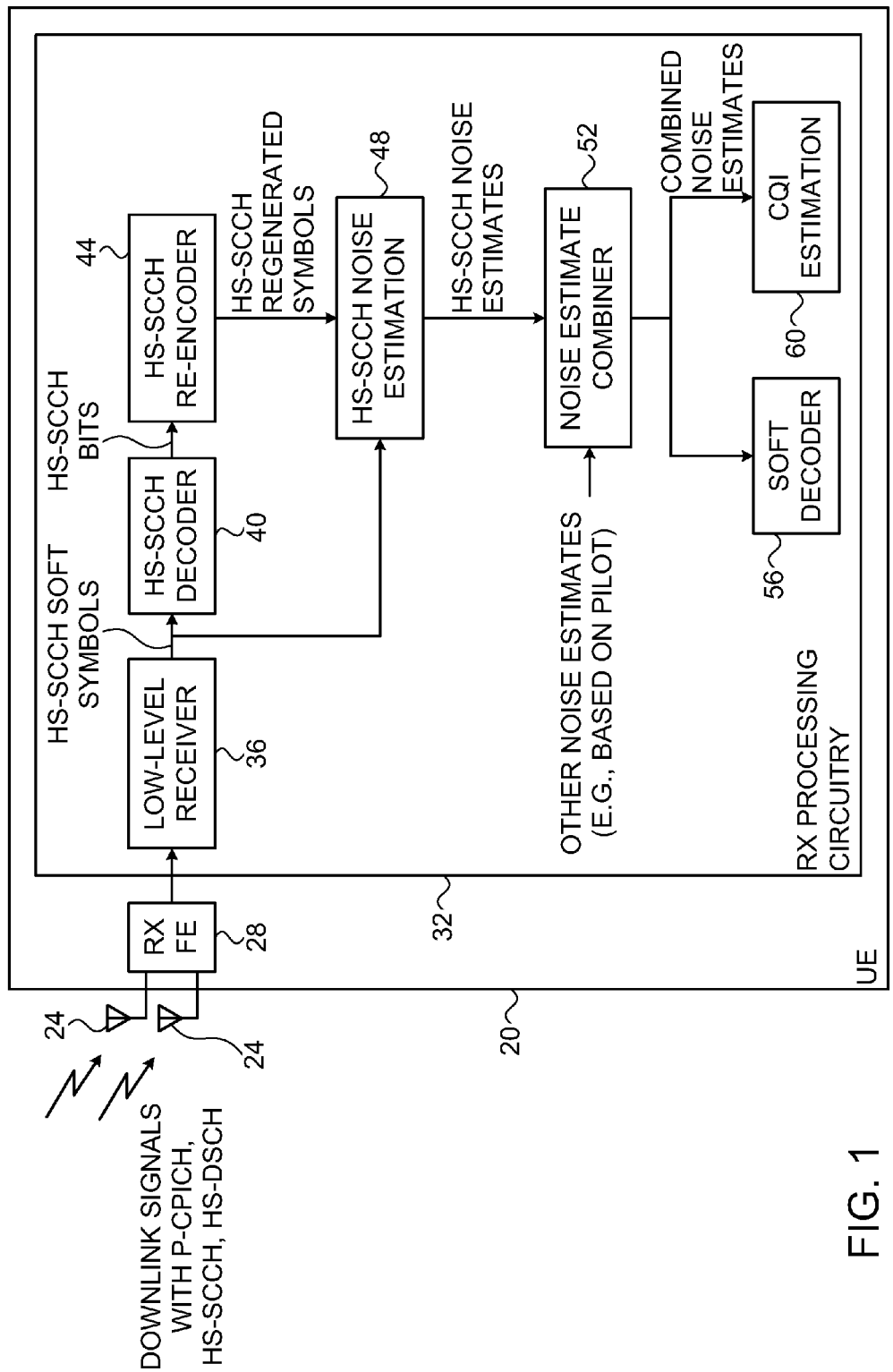
FIG. 1 is a block diagram that schematically illustrates a mobile communication terminal, in accordance with an embodiment that is described herein.

Embodiments that are described herein provide improved methods and systems for noise estimation in Wideband Code-Division Multiple Access (WCDMA) and other CDMA receivers. The disclosed techniques compute accurate noise level estimates for a data channel by combining measurements that are performed on a control channel and on a pilot channel.

In accordance with an embodiment, a receiver receives a CDMA carrier that carries at least a data channel, a pilot channel and a control channel. In the embodiments described herein, the receiver operates in the HSDPA mode, the data channel comprises HS-DSCH, the pilot channel comprises a Primary Common Pilot Channel (P-CPICH) and the control channel comprises HS-SCCH, as defined in 3GPP TS 25.308 cited above. The disclosed techniques, however, are applicable to other CDMA configurations and modes and to other types of channels, as well.

In an embodiment, the receiver produces a noise estimate for the HS-DSCH by estimating the noise level on the P-CPICH, estimating the noise level on the HS-SCCH and combining the two estimated noise levels. The receiver then uses the combined noise estimate, e.g., for computing soft metrics for decoding the HS-DSCH data and/or for estimating the HS-DSCH channel quality.

Noise estimation based on both the P-CPICH and the HS-SCCH is suitably accurate, since it exploits the benefits of the two types of channels: The HS-SCCH is typically transmitted with a lower spread factor than the P-CPICH (128 as opposed to 256), meaning that there are considerably more HS-SCCH symbols than P-CPICH symbols in any given Transmission Time Interval (TTI). Estimating the noise level on the HS-SCCH can therefore achieve smaller variance. On the other hand, there may be periods of time during which no HS-SCCH symbols are transmitted, whereas P-CPICH symbols are typically available at all times.

Moreover, because of the high spread factor of the P-CPICH, noise measurements on this channel are relatively sensitive to distortion due to leakage of the P-CPICH signal. Leakage of this sort may distort the noise estimation significantly. This sensitivity is especially harmful at high Signal to Noise Ratio (SNR). Noise measurements on the HS-SCCH are less sensitive than the P-CPICH to this sort of leakage because of the lower spread factor used on this channel. The disclosed techniques combine the high availability of the P-CPICH with the high accuracy of the HS-SCCH, to produce a highly accurate overall noise estimate for the HS-DSCH.

The HS-SCCH is typically transmitted at high reliability because it carries high-importance control information, it typically uses a single spreading code, and it is typically transmitted earlier than the corresponding HS-DSCH, in an embodiment. By using these properties of the HS-SCCH, the disclosed techniques estimate the noise for the HS-DSCH at high reliability and low latency, and using configurations that readily lend themselves to hardware or firmware implementation.

In some scenarios, the HS-SCCH and HS-DSCH (the control and data channels, respectively) are transmitted in different transmit diversity modes, meaning that noise measurements on the HS-SCCH cannot be used directly to indicate the noise on the HS-DSCH. In an example scenario, when the HS-DSCH is transmitted using Closed-Loop Transmit Diversity (CLTD), the HS-SCCH is transmitted using Space-Time Transmit Diversity (STTD). In some embodiments, the receiver processes the noise measurements on the HS-SCCH in order to match the noise characteristics of the HS-DSCH.

FIG. 1 is a block diagram that schematically illustrates a mobile communication terminal 20, in accordance with an embodiment that is described herein. In the present example, terminal 20 comprises a WCDMA User Equipment (UE) that supports the HSDPA operational mode. In alternative embodiments, terminal 20 may comprise any other suitable kind of mobile terminal The receiver section of terminal 20 comprises one or more receive antennas 24 for receiving downlink signals from a base station (not shown in the figure). The downlink signal comprises a WCDMA carrier that carries multiple WCDMA channels—at least a P-CPICH, one or more HS-SCCH and one or more HS-DSCH. The P-CPICH carries pilot symbols that are known in advance to the receiver and are used, for example, by terminals for synchronizing to the base station or for performing signal measurements. The HS-DSCH carries user data. The HS-SCCH carries control information such as configuration parameters, indications of the modulation and coding used on the HS-DSCH or any other suitable control information. In an embodiment, the HS-SCCH symbols are not known in advance to the receiver.

A Receiver Front End (RX FE) 28 down-converts the received analog signals from Radio Frequency (RF) to baseband and typically applies other functions such as filtering, amplification, gain control and digitization. The digitized baseband signals are provided to RX processing circuitry 32. FIG. 1 shows only the elements of circuitry 32 that are relevant to the disclosed noise estimation techniques, for the sake of clarity. The operations performed by the various elements of circuitry 32 are addressed in greater detail further below.

In an embodiment, RX processing circuitry 32 estimates the noise level on the HS-SCCH using a decision-directed process. In the present example, a low-level receiver 36 demodulates the HS-SCCH and produces soft HS-SCCH symbols. (The term "soft" in this context refers to numerical values that are represented using more than a single bit.) A HS-SCCH decoder 40 decodes the soft HS-SCCH symbols so as to produce HS-SCCH bits. A HS-SCCH re-encoder 44 re-encodes the HS-SCCH bits so as to produce regenerated symbols. In an embodiment, the regenerated HS-SCCH symbols are free of noise (or at least have a noise level that is considerably lower than that of the received soft HS-SCCH symbols). Therefore, assuming decoder 40 does not make decoding errors, comparing the regenerated HS-SCCH symbols (output of re-encoder 44) with the received HS-SCCH symbols (output of low-level receiver 36) gives an indication of the noise level on the HS-SCCH.

In some embodiments, HS-SCCH decoder 40 checks the Cyclic Redundancy Check (CRC) of the decoded HS-SCCH, and provides the decoded HS-SCCH bits to HS-SCCH re-encoder 44 only if the CRC is valid. This technique ensures that the regenerated HS-SCCH symbols are not distorted by possible decoding errors in HS-SCCH decoder 40.

An HS-SCCH noise estimation module 48 produces noise estimates for the HS-SCCH by comparing the regenerated HS-SCCH symbols with the received HS-SCCH symbols. This comparison is addressed in greater detail below. A noise estimate combiner 52 combines the HS-SCCH-based noise estimates with noise estimates from other sources. In an embodiment described with reference to FIG. 1, combiner 52 combines the HS-SCCH-based noise estimates with noise estimates that are based on the P-CPICH. Several alternative methods for noise estimation on the pilot channel are proposed below.

Noise estimate combiner produces combined noise estimates, which are indicative of the noise level on the HS-DSCH and which are based on both P-CPICH and HS-SCCH noise measurements. Circuitry 32 may use the combined noise estimates for various purposes. In some embodiments, a soft decoder 56 decodes soft HS-DSCH symbols in order to recover the data transmitted in the HS-DSCH. In an embodiment, soft decoder 56 computes soft decoding metrics based on the combined noise estimates provided by combiner 52, and decodes the HS-DSCH symbols using the soft decoding metrics.

In some embodiments, a Channel Quality Indicator (CQI) estimation module 60 estimates the channel quality on the HS-DSCH based on the combined noise estimates provided by combiner 52. The CQI is typically reported to the base station over an uplink channel (not shown in the figure). Further alternatively, circuitry 32 may use the combined noise estimates for any other suitable purpose.

The UE and processing circuitry configurations seen in FIG. 1 are example configurations, which are depicted solely for the sake of clarity. In alternative embodiments, any other suitable UE and processing circuitry configurations can be used. UE and processing circuitry elements that are not mandatory for understanding of the disclosed techniques have been omitted from the figure for the sake of clarity.

In some embodiments, some or all of the elements of UE 20 are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain UE elements, such as certain elements of processing circuitry 32, are implemented in a programmable processor, such as a Digital Signal Processor (DSP) device, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
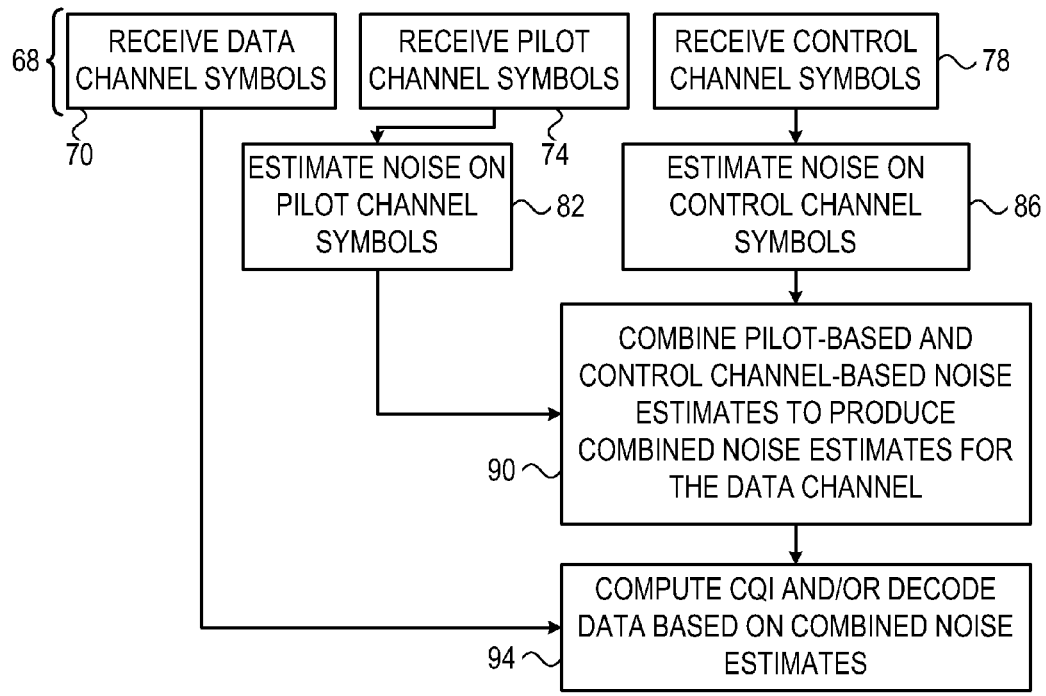
FIG. 2 is a flow chart that schematically illustrates a method for estimating noise level for a High-Speed Downlink Shared channel (HS-DSCH) based on High-Speed Shared Control Channel (HS-SCCH) measurements, in accordance with an embodiment that is described herein.

FIG. 2 is a flow chart that schematically illustrates a method for estimating noise level for the HS-DSCH based on HS-SCCH measurements, in accordance with an embodiment that is described herein. The method begins with UE 20 (FIG. 1) receiving a WCDMA carrier, at a reception operation 68. Reception of the WCDMA carrier comprises receiving data channel (in the present example HS-DSCH) symbols at a data reception operation 70, receiving pilot channel (in the present example P-CPICH) symbols at a pilot reception operation 74, and receiving control channel (in the present example HS-SCCH) symbols at a control reception operation 78.

Processing circuitry 32 of UE 20 estimates the noise level on the P-CPICH symbols, at a pilot symbol noise estimation operation 82. Circuitry 32 estimates the noise level on the HS-SCCH symbols, at a control noise estimation operation 86. Combiner 52 in circuitry 32 combines the pilot-channel-based (P-CPICH-based) and control-channel-based (HS-SCCH-based) noise estimates to produce combined noise estimates, at an estimate combining operation 90. The combined noise estimates are indicative of the noise level on the HS-DSCH. Processing circuitry 32 uses the combined noise estimates, e.g., for soft decoding the HS-DSCH data and/or for CQI estimation, at a processing operation 94.

The following description gives additional details as to the implementation of the method of FIG. 2, and the operation of the elements of processing circuitry 32, in accordance with an embodiment. The description assumes a single-path channel between the base station and UE 20. The disclosed techniques, however, are in no way limited to single-path channels, and the equations below can be extended to cover multi-path channels and other suitable channel models, as well.

When UE 20 comprises two receive antennas 24 and operates in a normal mode (i.e., not in transmit diversity), the received WCDMA signal can be written as:

$$\begin{bmatrix} v_1 \\ v_2 \end{bmatrix} = \begin{bmatrix} h_1 \\ h_2 \end{bmatrix}(\tilde{c}_{HSD} + \tilde{c}_P + \tilde{c}_{HSC} + \tilde{c}_{OTHER}) + \begin{bmatrix} \eta_1 \\ \eta_2 \end{bmatrix} \quad \text{Equation 1:}$$

The 1 and 2 subscripts in Equation 1 refer to the index of the receive antenna, $\tilde{c}_{HSD}$ denotes a combined transmitted symbol and chip on the HS-DSCH, $\tilde{c}_p$ denotes a combined transmitted symbol and chip on the pilot channel, $\tilde{c}_{HSD}$ denotes a combined transmitted symbol and chip on the HS-SCCH, $\tilde{c}_{OTHER}$ denotes the sum of all other chips and symbols transmitted on the WCDMA carrier, h denotes the channel taps (channel response from the base station to the UE), and η denotes the noise components in the received signal. For the sake of simplicity, although not necessarily, the noise power is assumed equal for both receive antennas. The noise power is denoted $\sigma_\eta^2$.

In some embodiments, circuitry 32 decodes the HS-DSCH by processing the received spread-spectrum chips of the HS-DSCH signal, and decoding the chips to produce soft outputs per symbol. For a linear receiver, a Finite Impulse Response (FIR) is applied to the received chips, i.e., $F^H v$. The chip outputs are then de-spread using the appropriate HS-DSCH spreading code over the symbol period (with a spread factor $SF_{HSD}=16$ chips per symbol), to produce soft symbol outputs.

The soft HS-DSCH symbols can be written in matrix form as:

$$x = \gamma_{HSD} F^H h s_{HSD} + F^H n_{HSD} = \gamma_{HSD} G s_{HSD} + F^H n_{HSD} \quad \text{Equation 2:}$$

wherein $O^H$ denotes complex conjugate and transpose, $v=[V_1\ V_2]^T$, $F=[F_1\ F_2]^T$, $h=[h_1\ h_2]^T$ where the subscripts refer to the receive antenna index, $Y_{HSD}$ denotes a factor that is dependent on the HS-DSCH transmit power and spread factor, $G=F^H h$ denotes the signal gain, and $S_{HSD}$ denotes the transmitted HS-DSCH symbol (using QPSK, 16QAM or 64QAM modulation) normalized to unit power. Interference from other physical channels transmitted from the same cell is not addressed, since all downlink channels are assumed orthogonal. The power of each element of $n_{HSD}$ is $\sigma^2=\sigma_\eta^2 SF_{HSD}$. The HS-DSCH noise power is thus given by:

$$F^H F \sigma_\eta^2 SF_{HSD}. \quad \text{Equation 3:}$$

It is noted that in an embodiment the linear processor $F^H$ (FIR filter) can be used to implement various types of receivers. For a RAKE receiver, for example, $F=\hat{h}$ it, wherein $\hat{h}$ denotes the estimated channel for the two receive antennas. For Maximal Ratio Combining (MRC), each $\hat{h}_i$ is replaced by $\hat{h}_i/\sigma_i^2$ in the RAKE receiver. For a Minimum Mean Square Error (MMSE) equalizer receiver, the equalizer filter taps $F_i$ for each antenna can be obtained by solving arg minE $[|\tilde{c}_{d-F}{}^H v|^2]$, which yields $F=(\hat{R}_{vv})^{-1}\hat{h}$, where $$R_{vv} = E\begin{bmatrix} v_1 v_1^* & v_1 v_2^* \\ v_2 v_1^* & v_2 v_2^* \end{bmatrix}.$$

E[] denotes expectation and $\tilde{c}_d$ denotes the desired combined chip/symbol.

As explained above, in some embodiments processing circuitry 32 estimates the noise level for the HS-DSCH using the pilot channel (P-CPICH). Following the above equations, the soft symbol output of the pilot channel can be written as:

$$y = y_p G s_p + F^H n_p \quad \text{Equation 4:}$$

wherein the pilot noise power is given in Equation 3 above, but with $SF_{HSD}$ replaced with the pilot channel spread factor $SF_p$. Therefore, once the noise level of the pilot channel is estimated successfully, the noise power of the HS-DSCH can be estimated by scaling the noise level of the pilot channel by the spread factor ratio $SF_{HSD}/SF_P$.

Processing circuitry 32 may use various methods to estimate the noise level of the pilot channel. In one embodiment, the circuitry estimates the received pilot signal and subtracts it from the pilot soft symbol output (Equation 4) in order to obtain a noise estimate. This solution is simple to implement, since the pilot symbols are known a-priori to the receiver, and therefore the receiver should only estimate $y_p G$. In this embodiment, a noise sample is obtained for each soft pilot symbol, and multiple noise samples are then squared and averaged to produce a noise power estimate. In practice, however, this scheme is sometimes inaccurate because it attempts to estimate noise levels that are several orders of magnitude smaller than the signal (e.g., 30-40 dB smaller in some scenarios).

In alternative embodiments, the pilot channel noise estimation uses the fact that the pilot symbols are constant and that the signal component (as opposed to the noise component) of the received pilot channel changes slowly over time. This assumption holds in most practical scenarios, even for high UE velocities relative to the base station.

In an example embodiment, circuitry 32 computes differences between successive received pilot symbols. Assuming the signal component does not change considerably between two successive symbols, and assuming the noise is uncorrelated between symbols, the signal components of the two pilot symbols will effectively cancel out when calculating the differences, and the differences will therefore be indicative of the pilot channel noise.

The resulting noise samples are given by $F^H(n_p{}^I - n_p{}^{II})$, wherein the I and II superscripts refer to the two neighboring pilot symbols. The noise power is given by $F^H F \sigma_n^2 SF_p$. Circuitry 32 squares and averages the differences, to produce a pilot channel noise power estimate. Since the estimate is based on differences, typically it is normalized by an additional factor of two in order to reflect the true noise power.

In an alternative embodiment, circuitry 32 defines a range of N symbols over which the signal part of the pilot channel is assumed constant, and then computes differences between pairs of pilot symbols that are no more than N symbols apart. Each difference gives a respective noise sample, and multiple such samples are squared and averaged. The result is normalized by two to produce the pilot channel noise power estimate.

In yet another embodiment, circuitry 32 defines a range of N symbols over which the signal part of the pilot channel is assumed constant, and estimates the noise power by calculating:

$$\hat{\sigma}_N^2 = \frac{1}{N-1} \sum_n^N |y_n - \hat{m}_y|^2 \quad \text{Equation 5:}$$

wherein $\hat{m}_y = \sum_n^N y_n$ denotes the average over the range of N received pilot symbols. Further alternatively, processing circuitry 32 may estimate the pilot channel noise power using any other suitable technique.

Returning now to the estimation of the control channel (HS-SCCH) noise power: The soft HS-SCCH symbols (the output of low-level receiver 36) can be written as:

$$z = Y_{HSC} G s_{HSC} + F^H n_{HSC} \quad \text{Equation 6:}$$

wherein the noise variance $n_{HSC}$ is larger by a factor of $SF_{HSC}/SF_{HSD}$ than the noise variance $n_{HSD}$, because of the difference in spread factors between the control and data channels. After normalizing by this factor, any noise power estimate for the HS-SCCH will reflect the noise power of the HS-DSCH.

In some embodiments, as explained above, decoder 40 in circuitry 32 decodes the soft HS-SCCH symbols, re-encoder 44 regenerates the symbols, and module 48 then compares the soft HS-SCCH symbols with the regenerated symbols to produce noise power estimates for the HS-SCCH.

In an embodiment, decoder 40 estimates the transmitted symbol values by decoding the HS-SCCH bits, including convolutional or other decoding, and then checking the Cyclic Redundancy Check (CRC). If the CRC verification indicates that the HS-SCCH symbols were decoded successfully, re-encoder 44 regenerates the HS-SCCH symbols from the decoded bits. Re-encoder 44 typically repeats the encoding steps performed at the base station transmitter to map bits to HS-SCCH QPSK symbols, $s_{HSC}$ including convolutional encoding.

HS-SCCH noise estimation module 48 then uses the regenerated HS-SCCH symbols $s_{HSC}$ and the estimated power factor and gain to subtract the signal component of the HS-SCCH and produce noise power estimates. From Equation 6 above we get:

$$z - \hat{Y}_{HSC} \hat{G} s_{HSC} \approx F^H n_{HSC} \quad \text{Equation 7:}$$

Typically, module 48 squares and averages multiple such subtraction results, to obtain the HS-SCCH noise power estimate.

In an alternative embodiment, instead of subtracting regenerated HS-SCCH symbols from soft HS-SCCH symbols, module 48 rotates (multiplies) the soft HS-SCCH symbols by the respective complex conjugates of the regenerated symbols, i.e., by $S^*_{HSC}$. Without loss of generality we assume that $|S_{HSC}|=1$. This rotation effectively removes the effect of the variable data from the HS-SCCH symbols. Thus, the rotation produces a sequence of symbols whose signal component changes slowly over time, e.g., at less than a predefined rate. This sequence is referred to herein as a "virtual pilot." Applying the rotation to Equation 6 above gives:

$$zS^*_{HSC} = Y_{HSC} G + S^*_{HSC} F^H n_{HSC} \quad \text{Equation 8:}$$

As can be seen by comparing Equation 8 to Equation 4 above, the rotated HS-SCCH symbols are similar in form to the soft pilot symbols: Their signal component changes slowly over time. The noise power of each sample of the rotated HS-SCCH symbols is equal to the noise power of the original soft HS-SCCH symbols (and to the HS-DSCH noise power subject to normalization by $SF_{HSD}/SF_{HSC}$). Therefore, any of the above-described methods for pilot channel noise power estimation can be used to estimate the noise power on the rotated HS-SCCH symbols (virtual pilot). Module 48 may thus estimate the noise power of the HS-SCCH by applying any of these methods to the virtual pilot.

With reference to the configuration of FIG. 1 above, the linear processing denoted $F^H$ is typically performed by low-level receiver 36. In an embodiment, re-encoder 44 checks the HS-SCCH CRC for each TTI. If the CRC is valid, HS-SCCH-based noise estimation is performed for this TTI. Otherwise, noise estimation for this TTI is performed using other means, e.g., based only on the pilot channel. When performing HS-SCCH-based noise estimation, the HS-SCCH-based noise power estimate should be normalized by $SF_{HSD}/SF_{HSC}$. This normalization is typically performed by combiner 52.

In an embodiment, combiner 52 combines the pilot-based and HS-SCCH-based noise power estimates in various ways to produce the combined noise power estimates. In an embodiment, combiner 52 averages the two types of noise power estimates. In an example, combiner 52 computes the following Root Mean Square (RMS) average:

$$\hat{\sigma}_{HSD}^2 = \frac{1}{2}\hat{\sigma}_P^2 \frac{SF_{HSD}}{SF_P} + \frac{1}{2}\hat{\sigma}_{HSC}^2 \frac{SF_{HSD}}{SF_{HSC}} \quad \text{Equation 9:}$$

In an alternative embodiment, combiner 52 computes a weighted average, for example an average that weighs each noise estimate by the number of noise samples used to produce it:

$$\hat{\sigma}_{HSD}^2 = \quad \text{Equation 10:}$$

$$\frac{N_P}{N_{HSC}+N_P}\hat{\sigma}_P^2 \frac{SF_{HSD}}{SF_P} + \frac{N_{HSC}}{N_{HSC}+N_P}\hat{\sigma}_{HSC}^2 \frac{SF_{HSD}}{SF_{HSC}}$$

In a WCDMA system, each time slot typically has ten pilot symbols and twenty

HS-SCCH symbols, i.e., up to Np=10 and $N_{HSC}$=20 per slot. In an embodiment, the noise power estimates (the pilot-based or HS-SCCH-based estimate, or the combined estimate) are averaged over time in order to reduce its variance. This averaging may be performed before or after combining by combiner 52.

The embodiments described above address a normal transmission mode, i.e., a downlink signal transmitted from a single transmit antenna. In other embodiments, the WCDMA carrier is transmitted by the base station via multiple transmit antennas in a certain transmit diversity mode. One such mode is a Space-Time Transmit Diversity (STTD) mode, in which pairs of symbols are transmitted via two transmit antennas over two symbol intervals using Alamouti encoding. Another mode is a Closed-Loop Transmit Diversity (CLTD) mode, in which each symbol is transmitted via two transmit antennas while applying a respective weight to each transmit antenna in order to steer the transmission beam in a desired direction. The base station transmit antennas are referred to below as primary and diversity transmit antennas. The description below shows several example ways of using the disclosed noise estimation techniques in conjunction with the transmit diversity modes.

Typically, when the HS-DSCH is transmitted using the STTD mode, the HS-SCCH is also transmitted in the STTD mode. Therefore, as in the normal mode, the HS-SCCH noise power is indicative of the HS-DSCH noise power subject to normalization by the ratio of spread factors of the two channel types.

For a WCDMA carrier that is transmitted in the STTD mode, the received signal can be modeled as a generalization of Equation 1 above:

$$\begin{bmatrix} v_1 \\ v_2 \end{bmatrix} = \begin{bmatrix} h_{1p} & h_{1d} \\ h_{2p} & h_{2d} \end{bmatrix} \quad \text{Equation 11:}$$

$$\left(\begin{bmatrix} \tilde{c}_{HSD,p} \\ \tilde{c}_{HSD,d} \end{bmatrix} + \begin{bmatrix} \tilde{c}_{P,p} \\ \tilde{c}_{P,d} \end{bmatrix} + \begin{bmatrix} \tilde{c}_{HSC,p} \\ \tilde{c}_{HSC,d} \end{bmatrix} + \begin{bmatrix} \tilde{c}_{other,p} \\ \tilde{c}_{other,d} \end{bmatrix}\right) + \begin{bmatrix} \eta_1 \\ \eta_2 \end{bmatrix}$$

wherein the 1 and 2 subscripts refer to the receive antenna index, the p and d subscripts refer respectively to the primary and diversity transmit antenna, and h refers to the multipath channel response. For example, $h_{1p}$ denotes the channel tap between the primary base station transmit antenna and the first UE receive antenna.

In these embodiments, low-level receiver 36 applies primary and diversity linear processors denoted $F_p$ and $F_d$, respectively. For a RAKE receiver, for example, the linear processors are given by:

$$F_p = \begin{bmatrix} F_{1p} \\ F_{2p} \end{bmatrix} = \begin{bmatrix} h_{1p} \\ h_{2p} \end{bmatrix}, F_d = \begin{bmatrix} F_{1d} \\ F_{2d} \end{bmatrix} = \begin{bmatrix} h_{1d} \\ h_{2d} \end{bmatrix} \quad \text{Equation 12:}$$

For a MMSE equalizer receiver, as another example, the linear processors are given by:

$$F_p = \begin{bmatrix} F_{1p} \\ F_{2p} \end{bmatrix} = (\hat{R}_{vv})^{-1}\begin{bmatrix} h_{1p} \\ h_{2p} \end{bmatrix} \quad \text{Equation 13:}$$

$$F_d = \begin{bmatrix} F_{1d} \\ F_{2d} \end{bmatrix} = (\hat{R}_{vv})^{-1}\begin{bmatrix} h_{1d} \\ h_{2d} \end{bmatrix}$$

Demodulating the STTD HS-DSCH symbols involves operating over pairs of de-spread soft symbol outputs:

$$\begin{bmatrix} x_p^I & x_p^{II} \\ x_d^I & x_d^{II} \end{bmatrix} = \begin{bmatrix} F_{1p}^* & F_{2p}^* \\ F_{1d}^* & F_{2d}^* \end{bmatrix} \quad \text{Equation 14:}$$

$$\left(\begin{bmatrix} h_{1p} & h_{1d} \\ h_{2p} & h_{2d} \end{bmatrix}\begin{bmatrix} s_1 & s_2 \\ -s_2^* & s_1^* \end{bmatrix}\gamma_{HSD} + \begin{bmatrix} n_{HSD,1}^I & n_{HSD,1}^{II} \\ n_{HSD,2}^I & n_{HSD,2}^{II} \end{bmatrix}\right) =$$

$$\gamma_{HSD}\begin{bmatrix} G_{pp} & G_{pd} \\ G_{dp} & G_{dd} \end{bmatrix}\begin{bmatrix} s_1 & s_2 \\ -s_2^* & s_1^* \end{bmatrix} + \begin{bmatrix} F_p^H \\ F_d^H \end{bmatrix}[n_{HSD}^I n_{HSD}^{II}]$$

wherein the I and II superscripts refer to the indices of the successive symbols. As can be seen in the equation, the HS-SCCH symbols $S_1$ and $s_2$ are transmitted using STTD (Alamouti) encoding via the primary and diversity transmit antennas in two successive symbol intervals.

These two symbols are decoded using STTD (Alamouti) decoding:

$$s_1 = x_p^I + (x_d^{II})^* = \mu_{HSD} s_1 (G_{pp} + G_{dd}) + F_p^H n_{HSD}^I + (F_d^n{}_{HSD}^{II})^*$$

Equation 15:

$$s_2 = -(x_d^I)^* + \mu_{HSD} s_2 (G_{pp} + G_{dd}) - (F_d^H n_{HSD}^I)^* + F_p^n{}_{HSD}^{II}$$

Therefore, the noise power of the HS-DSCH is given by:

$$(F_p^H F_p + F_d F^H F_d) \sigma_n^2 SF_{HSD}$$

Equation 16:

Thus, in some embodiments, processing circuitry 32 estimates the HS-DSCH noise power based on the estimated HS-SCCH noise power using the techniques described above for the normal transmit mode. As explained above, decoder 40 decodes the HS-SCCH bits, re-encoder 44 regenerates the HS-SCCH symbols, and estimation module 48 rotates the soft HS-SCCH symbols by the complex conjugates of the respective regenerated symbols:

$$(z_p^I + (z_d^{II})^*) s_1^*, \; (-(x_d^I)^* + z_p^{II}) s_1^*$$

Equation 17:

wherein $z_p$ and $z_d$ respectively denote the primary and diversity de-spread soft HS-SCCH symbols, and $S_1$ and $s_2$ respectively denote the regenerated HS-SCCH symbols.

The two rotations of Equation 17 produce two virtual pilots in which the signal component varies slowly over time, generalizing the virtual pilots described above for the normal transmit mode. Thus, processing circuitry 32 can use any of the above-described noise estimation methods for estimating the noise power for the HS-DSCH based on these virtual pilots.

The noise power of each sample of the virtual pilot is given by $(F_p^H F_p \; FdHFd\sigma\eta 22SFHSC$, which is converted to HS-DSCH noise power estimate by multiplying by $+F_{HSD}/2SF_{HSC}$.

Typically, when the HS-DSCH is transmitted using the CLTD mode, the HS-SCCH is transmitted in the STTD mode, i.e., not in the same diversity mode as the HS-DSCH. The received signal in this case can be modeled as:

$$\begin{bmatrix} v_1 \\ v_2 \end{bmatrix} = \begin{bmatrix} h_{1p} & h_{1d} \\ h_{2p} & h_{2d} \end{bmatrix}$$

Equation 18:

$$\left( \begin{bmatrix} w_p \\ w_d \end{bmatrix} \tilde{c}_{HSD} + \begin{bmatrix} \tilde{c}_{P,p} \\ \tilde{c}_{P,d} \end{bmatrix} + \begin{bmatrix} \tilde{c}_{HSC,p} \\ \tilde{c}_{HSC,d} \end{bmatrix} + \begin{bmatrix} \tilde{c}_{other,p} \\ \tilde{c}_{other,d} \end{bmatrix} \right) + \begin{bmatrix} \eta_1 \\ \eta_2 \end{bmatrix}$$

wherein $w_p$ and $w_d$ denote the CLTD weights that are assigned in the base station to the signals transmitted via the primary and diversity transmit antennas, respectively. Typically for a 3GPP WCDMA system, $w_p = 1/\sqrt{2}$, $w_d = e^{j\phi}/\sqrt{2}$, wherein $\emptyset \in \{\pi/4, 3\pi/4, 5\pi/4, 7\pi/4\}$. We define $w = [w_p, w_d]^T$.

In some embodiments, recovering the CLTD HS-DSCH signal involves applying a linear processor in low-level receiver 36, followed by applying the primary and diversity CLTD weights and de-spreading over a symbol interval:

$$x = [w_p^* \; w_d^*] \begin{bmatrix} F_{1p}^* & F_{2p}^* \\ F_{1d}^* & F_{2d}^* \end{bmatrix}$$

Equation 19:

$$\left( \begin{bmatrix} h_{1p} & h_{1d} \\ h_{2p} & h_{2d} \end{bmatrix} \begin{bmatrix} w_p \\ w_d \end{bmatrix} \alpha_{HSD} s_{HSD} + \begin{bmatrix} n_{HSD,1} \\ n_{HSD,2} \end{bmatrix} \right) =$$

$$\alpha_{HSD} w^H G w s_{HSD} + w^H F^H n_{HSD}$$

The noise power of the HS-DSCH is thus given by:

$$w^H F^H F w \rho_n^2 SF_{HSD}$$

Equation 20:

By comparing Equation 20 with Equation 16 above, it can be seen that the HS-SCCH noise does not reflect the HS-DSCH noise, because of the different transmit diversity modes used for transmitting the two channels. In some embodiments, processing circuitry 32 manipulates the regenerated HS-SCCH symbols (outputs of re-encoder 44) to produce virtual pilots whose noise power is indicative of the HS-SCCH noise power. In an example embodiment, circuitry 32 combines pairs of regenerated HS-SCCH symbols while applying the CLTD weights:

$$q_p = w^H \left( s_1^* \begin{bmatrix} z_p^I \\ z_d^I \end{bmatrix} + s_2^* \begin{bmatrix} z_p^{II} \\ z_d^{II} \end{bmatrix} \right) =$$

Equation 21:

$$\alpha_{HSC} w^H \begin{bmatrix} G_{pp} & G_{pd} \\ G_{dp} & G_{dd} \end{bmatrix} \begin{bmatrix} 2 \\ 0 \end{bmatrix} + w^H F^H (s_1^* n^I + s_2^* n^{II})$$

$$q_d = w^H \left( -s_2 \begin{bmatrix} z_p^I \\ z_d^I \end{bmatrix} + s_1 \begin{bmatrix} z_p^{II} \\ z_d^{II} \end{bmatrix} \right) =$$

$$\alpha_{HSC} w^H \begin{bmatrix} G_{pp} & G_{pd} \\ G_{dp} & G_{dd} \end{bmatrix} \begin{bmatrix} 0 \\ 2 \end{bmatrix} + w^H F^H (-s_2 n_{HSC}^I + s_1 n_{HSC}^{II})$$

As noted above, $|s_i|^2 = 1$. Assuming the signal gain does not change, the signal components of the virtual pilots $q_p$ and $q_d$ are constant from one symbol to the next. The noise terms of the virtual pilots have the same power as the power of the HS-SCCH, subject to normalization by the spread factor ratio $SF_{HSD}/2SF_{HSC}$.

Therefore, in some embodiments, circuitry 32 estimates the noise power of the virtual pilots $q_p$ and $q_d$, using any of the above-described techniques, and uses these estimates to produce a noise power estimate for the HS-DSCH. Estimation may be performed over only one of the virtual pilots, or over both virtual pilots in order to increase the number of noise samples and reduce variance. Since the virtual pilots of Equation 21 are produced from pairs of HS-SCCH symbols, each virtual pilot produces ten outputs per slot.

Figure 3:
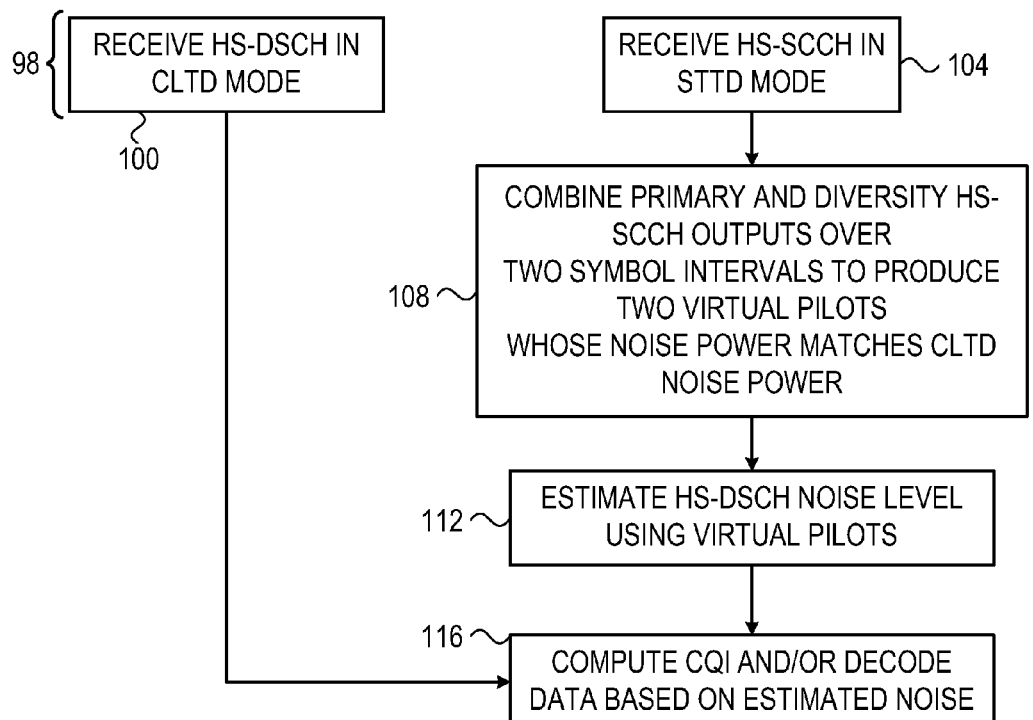
FIG. 3 is a flow chart that schematically illustrates a method for estimating noise level for a HS-DSCH that is transmitted in a Closed-Loop Transmit Diversity (CLTD) mode based on measurements on HS-SCCH transmitted in a Space-Time Transmit Diversity (STTD) mode, in accordance with an embodiment that is described herein.

FIG. 3 is a flow chart that schematically illustrates a method for estimating noise level for a HS-DSCH that is transmitted in CLTD mode based on measurements on HS-SCCH transmitted in STTD mode, in accordance with an embodiment that is described herein. In an embodiment, the method begins with UE 20 receiving a WCDMA carrier, at a carrier reception operation 98. Reception comprises receiving a HS-DSCH that is transmitted in CLTD mode, at a CLTD data reception operation 100, and receiving a HS-SCCH that is transmitted in STTD mode, at a STTD control reception operation 104.

Module 48 in processing circuitry 32 produces two virtual pilots, at a virtual pilot production operation 108. Circuitry 32 produces the virtual pilots by combining the primary and diversity regenerated HS-SCCH symbols over two symbol intervals. As shown above, the noise power of the resulting virtual pilots matches the noise power of the HS-SCCH that is transmitted in CLTD mode. Module 48 estimates the HS-SCCH noise power based on the virtual pilots, at an estimation operation 112. UE 20 then uses the HS-SCCH noise estimate, at a noise processing operation 116, for example for soft decoding by decoder 56 and/or for CQI estimation in module 60.

In some embodiments, the base station transmits the WCDMA carrier using a Multiple-Input Multiple-Output (MIMO) mode, also referred to as spatial multiplexing. In this mode, multiple different data streams are transmitted concurrently using the multiple transmit and receive antennas. In MIMO mode, the received signal can be regarded as multiple CLTD streams that are transmitted in parallel. Each stream has a CLTD-like noise term, in addition to an inter-stream interference noise term. In an embodiment, UE 20 uses the above-described CLTD HS-DSCH noise estimation methods for estimating the CLTD-like HS-DSCH noise power in MIMO mode.

Although the embodiments described herein refer mainly to reception and processing of WCDMA carriers, the disclosed techniques can be used with various other types of CDMA carriers. In the present context, the term "CDMA" includes WCDMA as well as any other form of CDMA.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
receiving a Code-Division Multiple Access (CDMA) signal carrying at least a data channel, a pilot channel that is spread using a first spread-spectrum code having a first spreading factor, and a control channel that is spread using a second spread-spectrum code having a second spreading factor, different from the first spread-spectrum code;
estimating a first noise level of noise on the pilot channel;
estimating a second noise level of noise on the control channel;
combining the first noise level and the second noise level, by weighting the first noise level based on the first spreading factor and weighting the second noise level based on the second spreading factor, so as to produce a noise estimate for the data channel;
calculating a Signal to Noise Ratio (SNR) for the data channel based on the noise estimate produced from the first noise level and the second noise level; and
determining and reporting a Channel Quality Indicator (CQI) based on the calculated SNR.

2. The method according to claim 1, wherein receiving the CDMA signal comprises receiving a Wideband CDMA (WCDMA) carrier, wherein estimating the second noise level comprises assessing the noise for a High-Speed Shared Control Channel (HS-SCCH), and wherein combining the first noise level and the second noise level comprises producing a noise estimate of noise on a High-Speed Downlink Shared channel (HS-DSCH).

3. The method according to claim 1, wherein estimating the second noise level comprises decoding the control channel to produce control data, re-encoding the control data to produce a regenerated control channel, and assessing the second noise level using the regenerated control channel.

4. The method according to claim 3, wherein assessing the second noise level comprises estimating a deviation of the received control channel from the regenerated control channel.

5. The method according to claim 3, wherein assessing the second noise level comprises:
applying, to the received control channel, a phase rotation that depends on the regenerated control channel, so as to produce a phase-rotated control channel, and assessing the second noise level on the phase-rotated control channel.

6. The method according to claim 5, wherein applying the phase rotation comprises converting the received control channel into a virtual pilot signal having a signal component that varies over time at less than a predefined rate.

7. The method according to claim 3, further comprising verifying a Cyclic Redundancy Check (CRC) of the decoded control channel, and re-encoding the control data only when the CRC is valid.

8. The method according to claim 1, wherein combining the first noise level and the second noise level comprises weighting the first estimated noise level and the second estimated noise level depending on respective numbers of samples of (i) the pilot channel and (ii) the control channel used in estimating the first noise level and the second noise level.

9. The method according to claim 1, wherein receiving the CDMA signal comprises:
receiving the data channel in a first transmit diversity mode; and
receiving the control channel in a second transmit diversity mode that is different from the first transmit diversity mode.

10. The method according to claim 9, wherein receiving the control channel comprises receiving primary symbols and diversity symbols of the control channel in accordance with the second transmit diversity mode, and wherein estimating the second noise level comprises combining the primary symbols and the diversity symbols to produce first virtual pilots and second virtual pilots, and estimating the second noise level using the first virtual pilots and the second virtual pilots.

11. The method according to claim 9, wherein receiving the data channel comprises receiving the data channel in a Closed-Loop Transmit Diversity (CLTD) mode, and wherein receiving the control channel comprises receiving the control channel in a Space-Time Transmit Diversity (STTD) mode.

12. The method according to claim 1, wherein receiving the CDMA carrier comprises receiving the data channel in a Multiple-Input Multiple-Output (MIMO) mode in which multiple data streams are transmitted concurrently via multiple transmit antennas.

13. An apparatus, comprising:
a receiver front end configured to receive a Code-Division Multiple Access (CDMA) signal carrying at least a data channel, a pilot channel that is spread using a first spread-spectrum code having a first spreading factor, and a control channel that is spread using a second spread-spectrum code having a second spreading factor, different from the first spread-spectrum code; and
processing circuitry configured to estimate a first noise level of noise on the pilot channel, to estimate a second noise level of noise on the control channel, to combine the first noise level and the second noise level, by weighting the first noise level based on the first spreading factor and weighting the second noise level based on the second spreading factor, so as to produce a noise estimate for the data channel, to calculate a Signal to Noise Ratio (SNR) for the data channel based on the noise estimate produced from the first noise level and the second noise level, and to determine and report a Channel Quality Indicator (CQI) based on the calculated SNR.

14. The apparatus according to claim 13, wherein the processing circuitry is configured to decode the control channel to produce control data, to re-encode the control data to produce a regenerated control channel, and to assess the second noise level using the regenerated control channel.

15. The apparatus according to claim 14, wherein the processing circuitry is configured to:
   apply, to the received control channel, a phase rotation that depends on the regenerated control channel, so as to produce a phase-rotated control channel, and
   assess the second noise level on the phase-rotated control channel.

16. The apparatus according to claim 13, wherein the receiver front end is configured to receive the data channel in a first transmit diversity mode, and to receive the control channel in a second transmit diversity mode that is different from the first transmit diversity mode.

17. A mobile communication terminal comprising the apparatus of claim 13.

18. A chipset for processing signals in a mobile communication terminal, the chipset comprising the apparatus of claim 13.

* * * * *